UNITED STATES PATENT OFFICE.

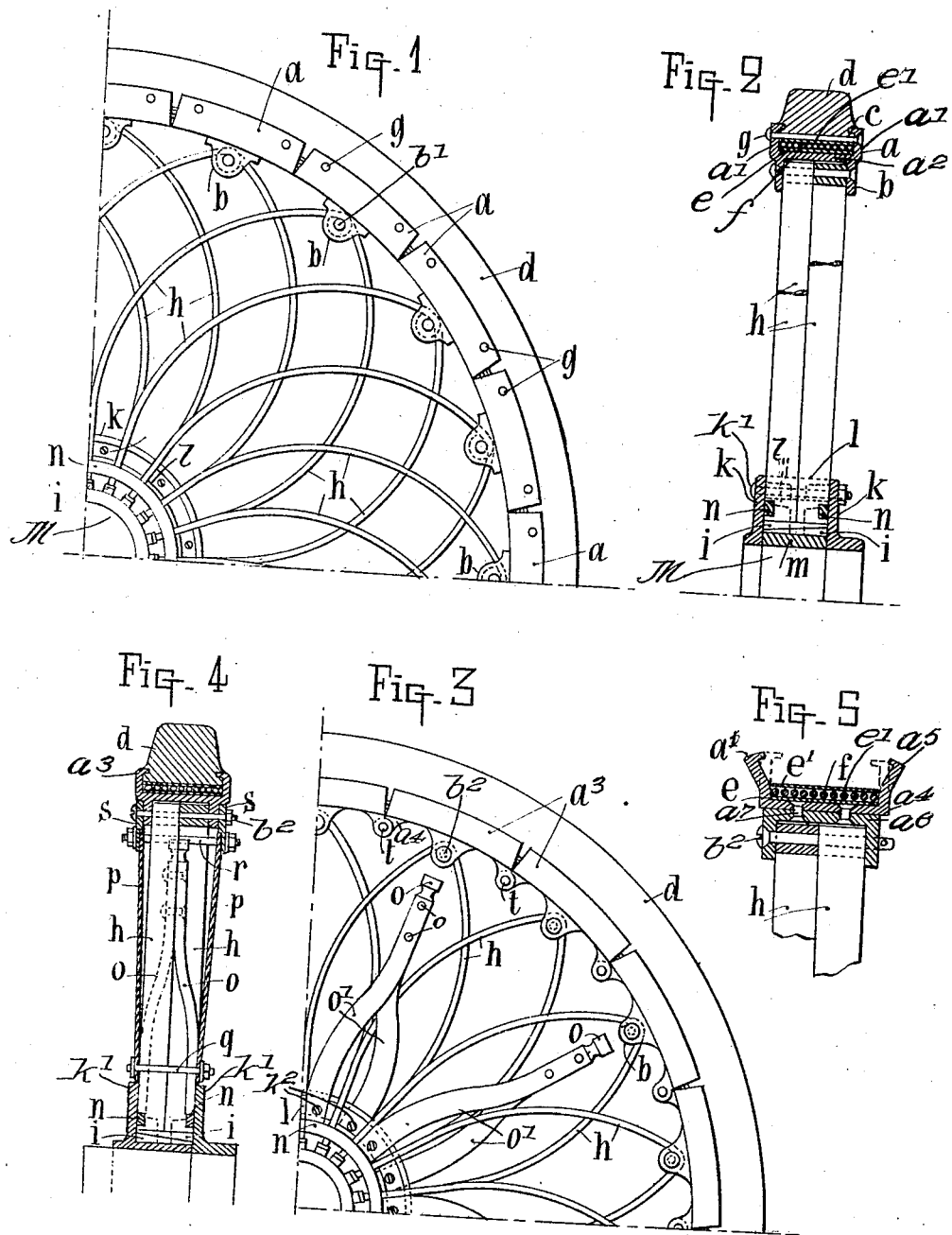

MARCEL COSSET, OF PARIS, FRANCE.

ELASTIC WHEEL.

No. 848,971.　　　Specification of Letters Patent.　　Patented April 2, 1907.

Application filed February 17, 1906. Serial No. 301,681.

*To all whom it may concern:*

Be it known that I, MARCEL COSSET, a citizen of the Republic of France, residing at 12 Rue Demarquay, Paris, France, builder, have invented a certain new and useful Improvement in An Elastic Wheel for Vehicles and the Like, of which the following is a specification.

This invention relates to elastic wheels, and consists in the provision of a wheel of this character provided with a segmental felly and is adapted for use in connection with that character of vehicle wherein rubber tires are required.

According to my invention the segmental felly is yieldingly supported from the hub, preferably by spring-spokes, and the invention is further characterized by the construction of the spokes and improved means for connecting the same with the hub and felly.

The invention will be more fully described in connection with the accompanying drawings and will be pointed out and particularly ascertained in and by the appended claims.

In the drawings, Figure 1 is a view in side elevation of a portion of a wheel embodying certain features of my invention. Fig. 2 is a sectional view thereof. Fig. 3 is a view in elevation of a portion of a wheel embodying additional features of the invention. Fig. 4 is a sectional view thereof. Fig. 5 is a sectional view of a felly, showing a modification of the means for connecting the spokes therewith.

Like characters of reference designate similar parts throughout the different figures of the drawings.

First describing the construction shown in Figs. 1 and 2, $a$ indicates a plurality of segments which collectively form the felly. As shown in Fig. 2, said segments are of U-shaped cross-section and form an annular seat for a tire $d$, the latter being of the solid-rubber type. It will, however, be obvious that the improved construction is adapted for use in connection with other forms of tires. As shown, the side walls $a'$ of the segments are provided with gripping-flanges $c$, adapted to be embedded in and engage the tire $d$. The flanges $c$ are held in a gripping position by bolts or rivets $g$, passing through the walls $a'$.

Means are provided for maintaining the segments $a$ in alinement, which means also serve to prevent radial displacement of any one of the segments beyond a predetermined point. Said means, as shown, consists of superimposed metallic ribbons and cables $e f e'$. I prefer to provide ribbons which completely fill the recess formed by the side walls $a'$, in order to effectively prevent lateral displacement of the segments. The parts are assembled so that the segments in their normal position will engage each other at their inner ends, as shown in Fig. 1, and the ends of said segments are preferably parallel, so as to form intervening V-shaped spaces to permit the segments to yield inwardly without wedging. The inner ribbon $e$ is of a length to tightly engage the lower wall $a^2$ when the segments $a$ are in their normal position. Upon the ribbon $e$ is wound a cable $f$, which preferably fills the space between the side walls $a$, and upon the cable $f$ is wound a second ribbon $e'$. Each segment is provided on its lower face with ears $b$, adapted to receive pintles $b'$.

A hub is shown at M and is connected with the felly by spring-spokes $h$. I preferably arrange the spokes $h$ in pairs, each pair being oppositely flexed and connected at their outer ends to the segments $a$ and at their inner ends to the hub M. Said springs $h$ are composed of flat strips of metal, and the combined width of each pair is sufficient to fill the space between the ears $b$. The ends of the springs $h$ are preferably wound about the pintles $b'$, and opposite springs of alternate pairs are located in alinement with each other, while the springs of each pair are out of alinement with each other. The hub M consists, as shown in Figs. 1 and 2, of a central hub member $m$, preferably equal in length to the combined width of a pair of springs $h$. To the opposite ends of said member $m$ are clamped two hub extensions $k$ by means of bolts $k'$. Said hub extensions $k$ are provided with annular flanges $n$, adapted to engage recesses in the springs $h$ and serve to retain the same and prevent radial displacement of the same. The springs $h$ preferably extend below the annular flanges $n$, but do not extend into engagement with the member $m$, the intervening space being filled by wedging devices $i$, which are engaged by the hub extensions $k$. Said wedging devices $i$ consist of oppositely-inclined wedge-blocks, whose inclined faces are disposed in abutting relation in such a manner that when their ends are brought in parallel planes by the extensions $k$, as shown in Fig. 2, they engage the member $m$ and the inner ends of the springs $h$ and engage the latter tightly with the flanges $n$. In order to space the hub ends of the springs $h$ properly the one from the other, or, as shown, one pair from the other, there are provided spacing devices in the form of flanges $l$, which, as shown, extend between the hub extensions $k$ and engage the ends of the springs $h$ on their opposite faces.

Next referring to the construction shown in Figs. 3 and 4, the segments $a^3$ are shown movably connected with each other, the connection being in the form of a pivotal joint comprising lugs $a^4$, connected by pintles $t$. This pivotal connection of the segments facilitates assembling of the parts and assists in maintaining the segments in alinement. Other parts of the form shown in these figures are similar to the construction shown in Fig. 1, except the following parts, which will now be described.

When a wheel of this construction is used for heavy traffic, it is desirable to limit yielding displacement of the several segments, and to this end there is provided a plurality of stops O, the outer ends of which are adapted to engage the ends of the springs $h$, which are wound about the pintles $b'$. Said stops O are preferably made of two parts or legs $o'$, riveted together at $o$. Said legs $o'$ extend inwardly and are secured to hub extensions $k'$ by rivets or bolts $k^2$. In order that the legs $o'$ may not interfere with the springs $h$, the said legs are separated circumferentially around the wall in a manner to be attached to the hub extensions $k'$ at points between the springs $h$.

In certain types of wheels it is desirable to inclose the springs and prevent the accumulation of dirt and foreign substances, and to this end I provide, as shown in Fig. 1, annular side plates $p$, adapted to be bolted at their inner margins at $q$. At their outer margins said plates are secured by bolts $r$ to rings $s$, the latter being anchored to the segments $a^3$ by bolts $b^2$. In order to permit the segments $a^3$ to yield when the wheel engages an obstruction in the road-bed, I preferably provide the rings $s$, made of yielding material, such as rubber.

In Fig. 5 is shown an improved form of segment $a^4$, wherein the side walls $a^5$ are displaced in opposite directions to permit insertion of the tire, said wheels being subsequently bent inwardly, as shown in dotted lines, to firmly grip the tire. In this form the springs $h$ are secured by a pintle $b^2$ to an independent anchoring-block $a^6$, riveted at $a^7$ to the segment $a^4$.

I claim—

1. A wheel comprising in combination a hub, a segmental felly, means connecting said hub and felly, and means for alining the segments of said felly, said means comprising a metallic ribbon and a cable.

2. A wheel comprising in combination a hub, a segmental felly, means uniting the felly and hub, and means for alining the segments of said felly comprising superimposed metallic ribbons and cables.

3. A wheel comprising in combination a hub, a segmental felly, means uniting the hub and felly, the segments of said felly being of U-shaped cross-section adapted to receive the tire, and means for alining the segments of said felly and seated in said segments and comprising alternately-disposed metallic ribbons and cables.

4. A wheel comprising in combination a hub, a segmental felly, spring-spokes connecting said hub and felly, said hub being provided with annular flanges engaging the spokes laterally, and wedging devices engaging the ends of said spokes.

5. A wheel comprising in combination a hub, a segmental felly, and spring-spokes engaging said felly and hub, said hub being provided with annular retaining-flanges engaging the spokes laterally, wedging devices engaging the ends of said spokes, and radial devices for separating the spokes.

6. A wheel comprising in combination a hub, a segmental felly, and springs connecting said felly and hub, said hub being provided with annular flanges engaging the springs laterally, wedging-blocks engaging the ends of said springs, and spacing devices for separating the springs.

7. A wheel comprising in combination a hub, a segmental felly, springs connecting said hub and felly, and means connected with said hub and yieldingly connected with said felly serving to inclose said springs.

In testimony whereof I have signed my name to this specification in the presence of two subscribing witnesses.

MARCEL COSSET.

Witnesses:
 EMILE COUCHOUD,
 HANSON C. COXE.